(12) United States Patent
Desai et al.

(10) Patent No.: US 12,555,622 B2
(45) Date of Patent: Feb. 17, 2026

(54) MEMORY WITH ONE-TRANSISTOR-BASED BIT LINE TRACKING CIRCUIT

(71) Applicant: QUALCOMM Incorporated, San Diego, CA (US)

(72) Inventors: Channappa Desai, Haveri (IN); Derek Yang, Poway, CA (US); Sunil Sharma, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 192 days.

(21) Appl. No.: 18/360,745

(22) Filed: Jul. 27, 2023

(65) Prior Publication Data

US 2025/0037753 A1   Jan. 30, 2025

(51) Int. Cl.
| | |
|---|---|
| *G11C 11/4078* | (2006.01) |
| *G11C 11/4076* | (2006.01) |
| *G11C 11/408* | (2006.01) |
| *G11C 11/4094* | (2006.01) |

(52) U.S. Cl.
CPC ...... *G11C 11/4078* (2013.01); *G11C 11/4076* (2013.01); *G11C 11/4085* (2013.01); *G11C 11/4094* (2013.01)

(58) Field of Classification Search
CPC ............ G11C 11/4078; G11C 11/4076; G11C 11/4085; G11C 11/4094; G11C 8/16; G11C 11/419; G11C 7/227
USPC .................................................. 365/189.011
See application file for complete search history.

(56) References Cited

U.S. PATENT DOCUMENTS

| | | | |
|---|---|---|---|
| 5,268,869 A | 12/1993 | Ferris et al. | |
| 7,289,373 B1 * | 10/2007 | Son | G11C 7/08 365/207 |
| 9,455,028 B1 | 9/2016 | Sahu | |
| 2003/0042528 A1 | 3/2003 | Forbes | |
| 2011/0032751 A1 * | 2/2011 | Funane | G11C 8/16 365/156 |
| 2011/0075470 A1 | 3/2011 | Liaw | |
| 2012/0051160 A1 | 3/2012 | Tao et al. | |
| 2015/0213881 A1 | 7/2015 | Rai et al. | |
| 2015/0348616 A1 | 12/2015 | Chiu et al. | |
| 2016/0125953 A1 * | 5/2016 | Kim | G11C 11/16 365/96 |
| 2016/0133316 A1 | 5/2016 | Wang | |
| 2018/0012649 A1 | 1/2018 | Ghosh et al. | |
| 2018/0033481 A1 | 2/2018 | Liaw | |
| 2021/0027833 A1 | 1/2021 | Chowdhury et al. | |

FOREIGN PATENT DOCUMENTS

JP   2015222610 A   * 12/2015

OTHER PUBLICATIONS

International Search Report and Written Opinion—PCT/US2024/032654—ISA/EPO—Aug. 13, 2024.

* cited by examiner

*Primary Examiner* — Huan Hoang
(74) *Attorney, Agent, or Firm* — Loza & Loza, LLP (57) ABSTRACT

A replica column for bit line tracking of a bitcell array is disclosed that includes just one replica access transistor for each row in the bitcell array. If there are N rows, there are thus N replica access transistors in the replica column, where N is a plural positive integer. The replica column includes no other transistors besides the replica access transistors.

26 Claims, 9 Drawing Sheets

FIG. 1

(PRIOR ART)

MEMORY WITH ONE-TRANSISTOR-BASED BIT LINE TRACKING CIRCUIT

TECHNICAL FIELD

This application relates to integrated circuit memories, and more particularly to a bit line tracking circuit for an integrated circuit memory.

BACKGROUND

An integrated circuit memory such as a static random-access memory (SRAM) typically includes self-timed tracking circuits to mimic the memory operation delays. For example, during a read operation, an SRAM asserts a word line voltage so that an accessed bitcell may drive its binary content onto a pair of corresponding bit lines. Depending upon the stored bit, one bit line in the bit line pair remains charged whereas the remaining bit line in the bit line pair is discharged. A bit line voltage difference thus develops between the bit lines in the bit line pair. Once the bit line voltage difference is sufficiently developed, the SRAM should release the word line voltage assertion and enable a sense amplifier to sense the bit. If the SRAM de-asserts the word line voltage and enables the sense amplifier too early, the sense amplifier may incorrectly sense the bit. Conversely, if the word line voltage is de-asserted and the sense amplifier is enabled too late, the operating speed of the SRAM is reduced. A similar bit line voltage difference occurs during a write operation. To mimic the bit line voltage development, the SRAM may include a bit line tracking circuit. In this fashion, the timing of the read and write operations may be optimized.

SUMMARY

In accordance with an aspect of the disclosure, a memory is provided that includes: a bitcell array arranged into rows and columns, wherein each column includes a plurality of N bitcells, N being a plural positive integer; and a bit line tracking circuit including: a replica column having a replica bit line and N replica access transistors coupled to the replica bit line, the replica column including no additional transistors; wherein the bit line tracking circuit is configured to control a timing of access to an addressed one of the columns responsive to a change in a voltage of the replica bit line.

In accordance with another aspect of the disclosure, a method of tracking a memory access is provided that includes: switching on an access transistor in a bitcell to begin a bit line voltage development period for a line, wherein the bitcell is included in a column of N bitcells, N being a plural positive integer; and emulating the bit line voltage development period using a replica column that includes N replica access transistors, wherein the replica column includes no additional transistors.

In accordance with yet another aspect of the disclosure, a replica column for a bit line tracking circuit is provided that includes: a replica bit line; and a plurality of n-type metal-oxide semiconductor (NMOS) replica access transistors, each having a source coupled to ground and a drain coupled to the replica bit line, wherein the replica column includes no additional transistors.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

A bit line tracking circuit is disclosed herein that is advantageously compact and low power. To provide a better appreciation of these advantages, some SRAM concepts will first be discussed. For example, consider a bitcell 100 shown in FIG. 1. A pair of cross-coupled inverters 105 latch a bit. An output terminal Q of one of the inverters is charged according to the binary value of the stored bit whereas an output terminal QB of a remaining one of the inverters is charged according to the binary value of the complement of the stored bit. During a read or write operation, a word line driver (not illustrated) asserts a voltage of a word line (WL) to switch on a pair of n-type metal-oxide semiconductor (NMOS) access transistors M1 and M2. The Q terminal then couples to a bit line (BL) whereas the QB terminal couples to a complement bit line (BLB). Since the access transistors M1 and M2 are common to both the read and write operations, they form a single port for accessing the bitcell 100 during read and write operations. Thus, bitcell 100 may also be denoted as a single-port bitcell.

Figure 1:
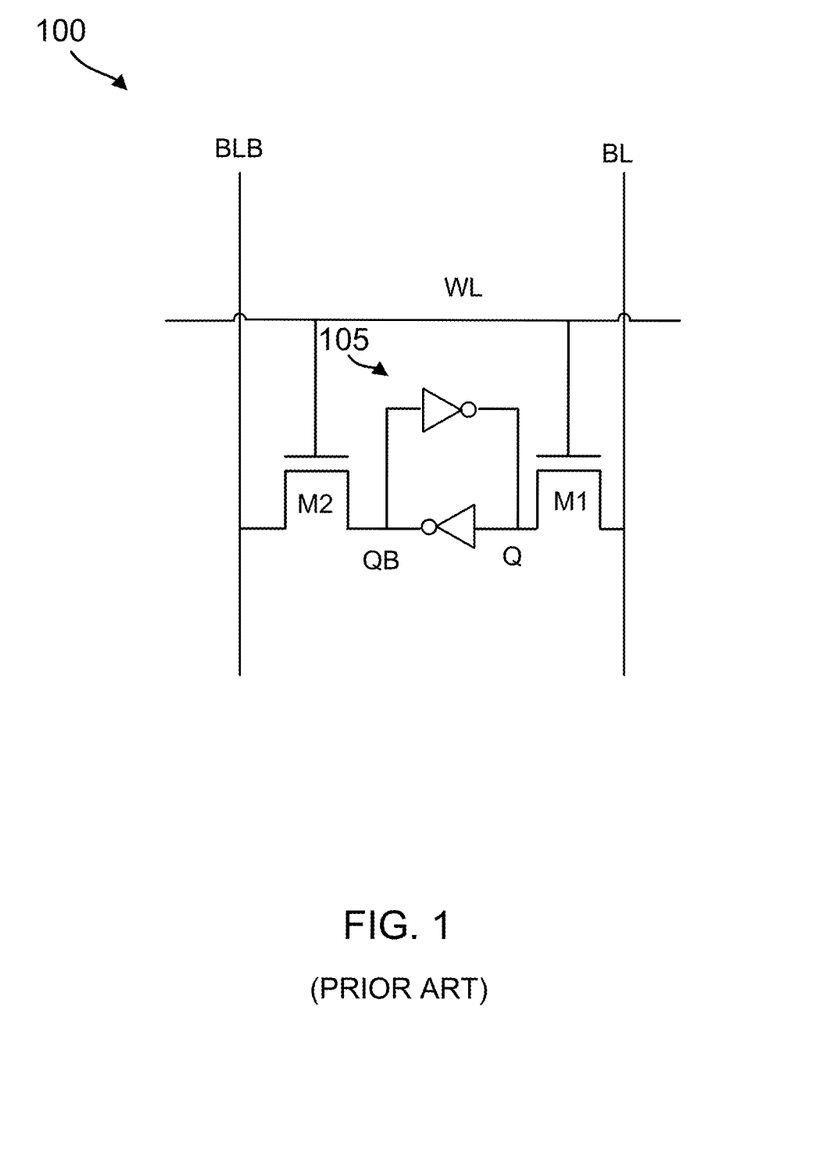
FIG. 1 illustrates a single-port bitcell that may be tracked in accordance with an aspect of the disclosure.

With the access transistors M1 and M2 switched on during a read operation, one of the bit lines will remain charged but the other bit line will begin to discharge. Which bit line remains charged and which bit line begins to discharge depends upon the binary value of the stored bit. For example, the complement bit line will discharge if the stored bit is a binary one (assuming an active-high convention is used). If the word line remained charged for a sufficiently long period, the complement bit line would discharge to ground. In such a case, the bit line voltage difference between the pair of bit lines bl and blb would be full rail (equal to the memory power supply voltage).

Although a full rail voltage difference would make the bit decision by the sense amplifier easier, the memory speed would be too slow due to the delay in holding the word line voltage asserted for so long. To provide increased memory speed, the bit line voltage difference is not developed full rail but instead to some fraction of the memory power supply voltage (note that the bit line voltage difference between the bit line and the complement bit line will be negative if the stored bit is a binary zero so in that case the bit line voltage difference would be developed to some fraction of the complement of the memory power supply voltage). To monitor when a sufficient bit line voltage difference has developed, the SRAM may use a bit line tracking circuit as discussed further herein. Once the bit line tracking circuit indicates that a sufficient bit line voltage difference should have been developed, the SRAM releases the word line voltage assertion and may enable a sense amplifier to sense the stored bit during a read operation.

Figure 2:
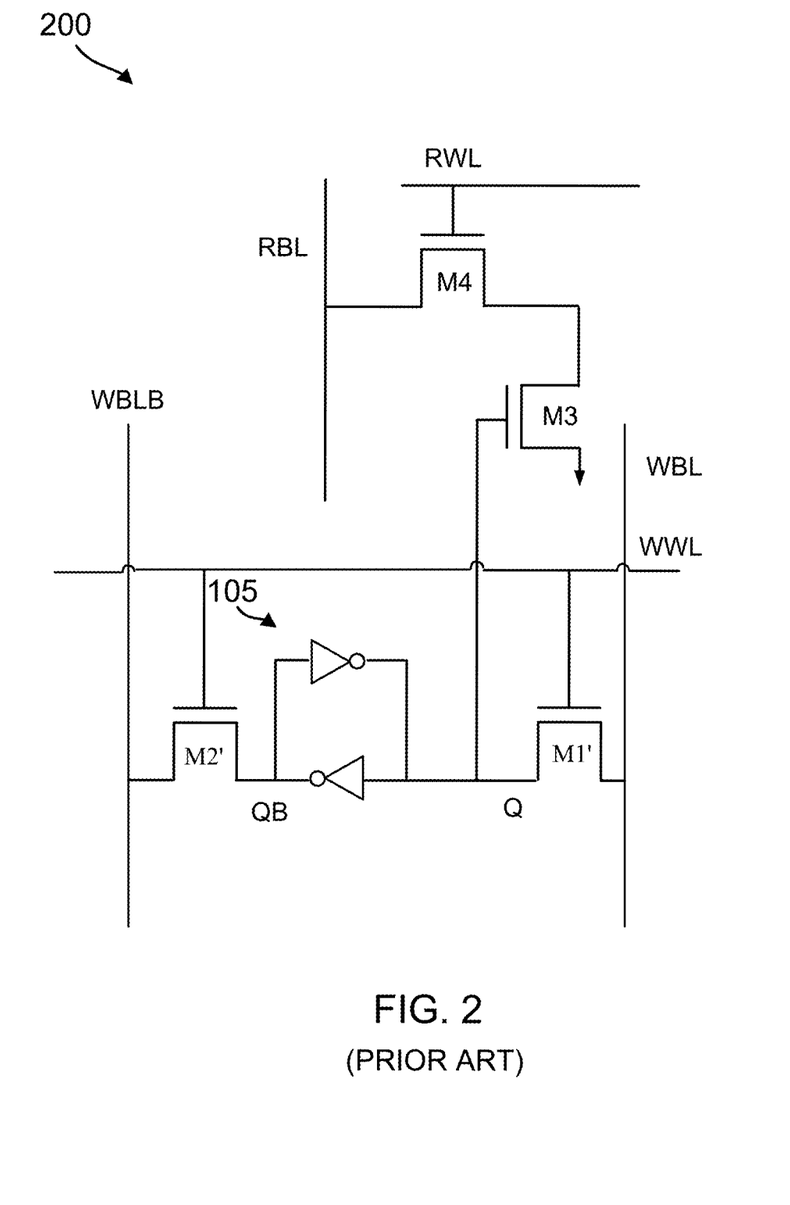
FIG. 2 illustrates a dual-port bitcell that may be tracked in accordance with an aspect of the disclosure.

The pair of cross-coupled inverters 105 uses four transistors for its implementation. Single-port bitcell 100 is thus a six-transistor (6T) bitcell since it includes the four transistors for the cross-coupled inverters 105 and also the two access transistors M1 and M2. An SRAM that includes an array of single-port bitcells 100 may be denoted as a single-port SRAM. But note that embedded memories may need to be accessed by more than one processor core. Thus, dual-port SRAMs have been developed so that more than one processor core may access the memory simultaneously. An example dual-port bitcell 200 is shown in FIG. 2. Bitcell 200 includes the pair of cross-coupled inverters 105 and a pair of write-port access transistors M1' and M2' arranged analogously as discussed with regard to access transistors M1 and M2 of the single-port bitcell 100. However, the write-port access transistors M1' and M2' are dedicated to a write port in the dual-port bitcell 200. Thus, the word line driving the gates of the write-port access transistors M1' and M2' in the dual-port bitcell 200 is a write word line (WWL). Similarly, the bit line coupled to a drain/source terminal of the write-port access transistor M1' in the dual-port bitcell 200 is a write bit line (WBL) whereas the complement bit line coupled to a drain/source terminal of the write-port access transistor M2' is a write complement bit line (WBLB). Write-port access transistors M1' and M2' and the write bit lines WBL and WBLB in the dual-port bitcell 200 form a write access port.

A combination of a read-port access transistor M3 and a read-port access transistor M4 forms part of a read access port for the dual-port bitcell 200. A gate of the read-port transistor M3 couples to the Q output terminal. Transistor M3 thus switches on if the dual-port bitcell 200 is storing a binary one. A drain of the read-port access transistor M3 couples to a source of the read-port access transistor M4. A read word line (RWL) couples to a gate of the read-port access transistor M4 and a read bit line (RBL) couples to a drain of the read-port access transistor M4. During a read operation, the read bit line will either stay charged or begin discharging depending upon whether the dual-port bitcell 200 is storing a binary one or a binary zero, respectively. As compared to the single-port bitcell 100, the dual-port bitcell 200 is an eight-transistor bitcell due to the presence of the read-port access transistors M3 and M4.

Figure 3:
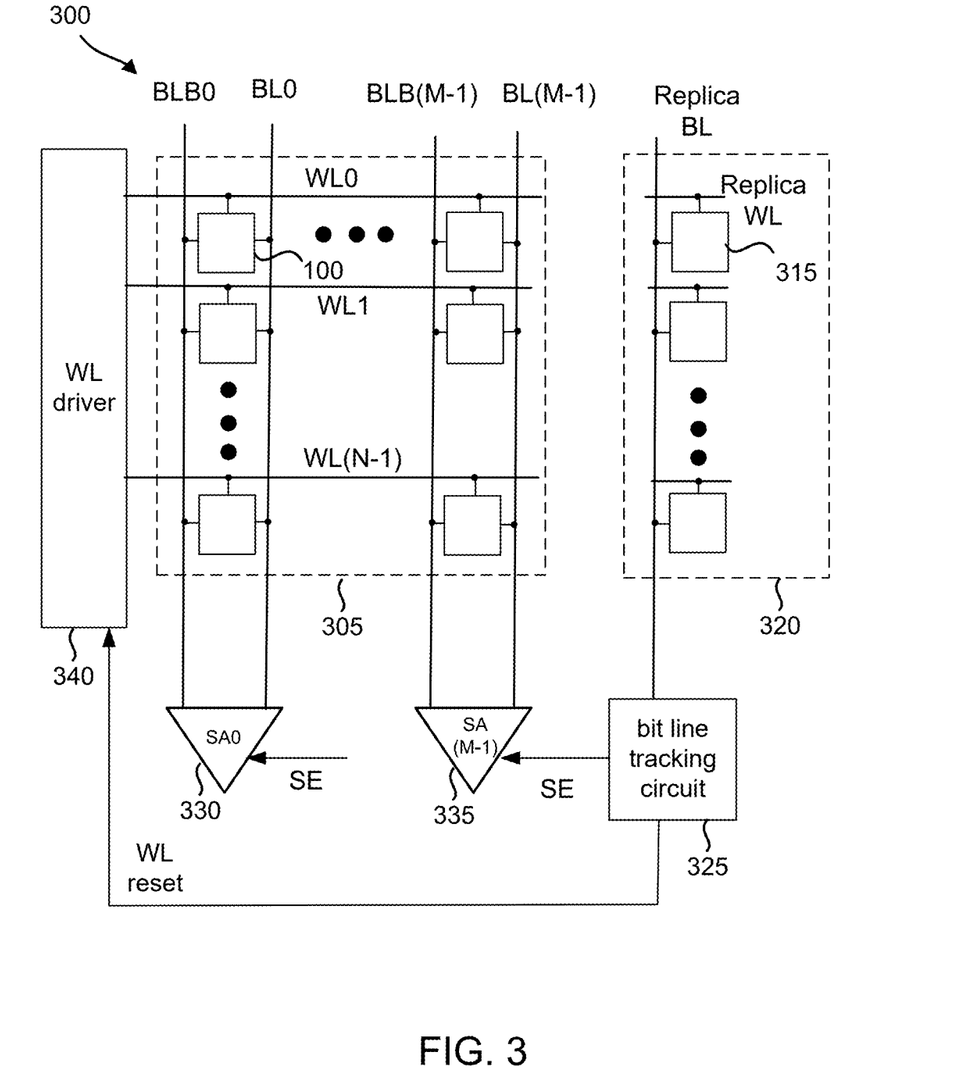
FIG. 3 illustrates a single-port SRAM having a conventional replica column for bit line tracking.

Regardless of how many ports each bitcell has, the bitcells are arranged into an array (which may also be denoted as a bank) by rows and columns. For example, an SRAM 300 is shown in FIG. 3 that includes an array 305 of bitcells 100. Bitcells 100 may be either dual-port or single-port bitcells or even triple-port bitcells. Each row is traversed by a common word line. Similarly, each column is traversed by a corresponding pair of bit lines. SRAM 300 includes N rows ranging from a zeroth row traversed by a zeroth word line WLo to an (N−1)th row traversed by an (N−1)th word line, where N is a positive plural integer. Similarly, SRAM 300 includes M columns ranging from a zeroth column traversed by a pair of zeroth bit lines BL0 and BLB0 to an (M−1)th column traversed by a pair of (M−1)th bit lines BL (M−1) and BLB (M−1), where M is a plural positive integer. In a dual-port implementation, each pair of bit lines would be a pair of write bit lines with the read bit line and read word line not shown for illustration clarity.

During a memory access (which may be either a read operation or a write operation), a row decoder (not illustrated) decodes a word line address to identify which word line will be asserted. A word line driver WL 340 responds to the decoded word line address and a clock signal (not illustrated) by asserting the addressed one of the word lines. To mimic the delay required to develop a sufficient bit line voltage difference during read and write operations following the word line assertion, SRAM 300 includes a replica bit line (Replica BL). For example, the replica bit line may have a capacitance and resistance substantially equal to a capacitance and resistance of the bit line for a single-port implementation. In that regard, a bit line may be formed as a trace or lead in a metal layer adjacent to the semiconductor substrate for the memory. The metal layer is masked and processed to form the appropriate length and width of the lead forming the bit line. The replica bit line may be formed in the same metal layer and have the same length and width so as to electrically model the behavior of the bit line it is replicating. Since each column in SRAM 300 includes N bitcells 100, the replica bit line couples to N corresponding replica bitcells 315. In a single-port implementation, each replica bitcell 315 is formed as discussed for single-port bitcell 100 except that the terminal of the equivalent of access transistor M2 that would otherwise couple to a complement bit line is grounded. Similar to the bitcell 100 shown in FIG. 1, each replica bitcell 315 is made up of 6 transistors in a single-port implementation. In a dual-port implementation, a replica of the access transistor M2' would be similarly grounded. A replica word line (Replica WL) couples to the gates of the access transistors (not illustrated) in each replica bitcell 315. Similar to the bitcell 200 shown in FIG. 2, each replica bitcell 315 in a dual-port implementation is made up of 8 transistors. The collection of the N replica bitcells 100, the replica bit line, and the replica word line forms a replica column 320.

SRAM 300 may then replicate the electrical behavior of the bit lines using the replica column 320 during both read and write operations in a single-port implementation. For example, during a read operation, each pair of bit lines may be sensed by a corresponding sense amplifier, ranging from a zeroth sense amplifier (SA0) 330 for the zeroth column to an (M−1)th sense amplifier (SA(M−1)) 335 for the (M−1)th column. During a read operation, a bit line tracking circuit 325 monitors the voltage change on the replica bit line (note that the bit line tracking circuit 325 includes the replica column 320 but is shown separately for illustration clarity). Once this voltage change indicates that a sufficient voltage difference has developed on the bit line pairs during the read operation, the tracking circuit 325 enables the sense amplifiers by asserting a sense enable (SE) signal to enable the sense amplifiers to perform their bit decisions. The tracking circuit 325 would also release the word line assertions at this time by asserting a word line (WL) reset signal to the word line driver 340.

Should SRAM 300 instead be a dual-port SRAM, the dual-port SRAM may include two replica columns, with each replica column including a plurality of N dual-port replica bitcells. Each dual-port replica bitcell would include eight transistors arranged analogously as discussed for dual-port bitcell 200. Note the problem, however, with such replica columns. Replica column 320 for a single-port SRAM implementation uses 6*N transistors. Similarly, each replica column 320 for a dual-port SRAM would use 8*N transistors. The resulting number of transistors in each replica column occupies a substantial amount of semiconductor die space in the integrated circuit including such memories. In addition, the relatively-large plurality of transistors contributes to leakage current loss.

To address these issues, a replica column is disclosed herein that uses only one replica access transistor for each corresponding bitcell-loading-of-a-bit-line being modeled. The resulting replica column is thus also denoted herein as a one-transistor (1T) replica column. Assuming there are N bitcells in each column in the corresponding bitcell array, each 1T replica column would thus need only N replica access transistors. In this fashion, only a fraction of the transistors used for traditional replica columns are used, which leads to a substantial semiconductor die space savings. In addition, the leakage current loss is substantially lowered.

Referring again to the single-port bitcell 100 and the dual-port bitcell 200, note that the write port of the dual-port bitcell 200 is analogous to the single port of the single-port bitcell 100 since both ports are accessed through a pair of bit lines. But the read port of the dual-port bitcell 200 is single-ended as there is only the read bit line. There is thus not a complement read bit line for the dual-port bitcell 200. This leads to a difference between the read operation to a single-port SRAM as compared to a read operation to a dual-port SRAM. In particular, each pair of bit lines in a single-port SRAM may be sensed by a sense amplifier that is enabled by the 1T bit line tracking disclosed herein. But the differential sensing by a sense amplifier is not amenable to sensing the single read bit line of a dual-port SRAM. Instead, an inverter is typically used to sense the bit decision from the read bit line in a dual-port SRAM. Unlike a sense amplifier (which typically can latch its bit decision), an inverter has no latching ability. Thus, a dual-port SRAM may include a data out register to latch the output from the inverter.

Figure 4:
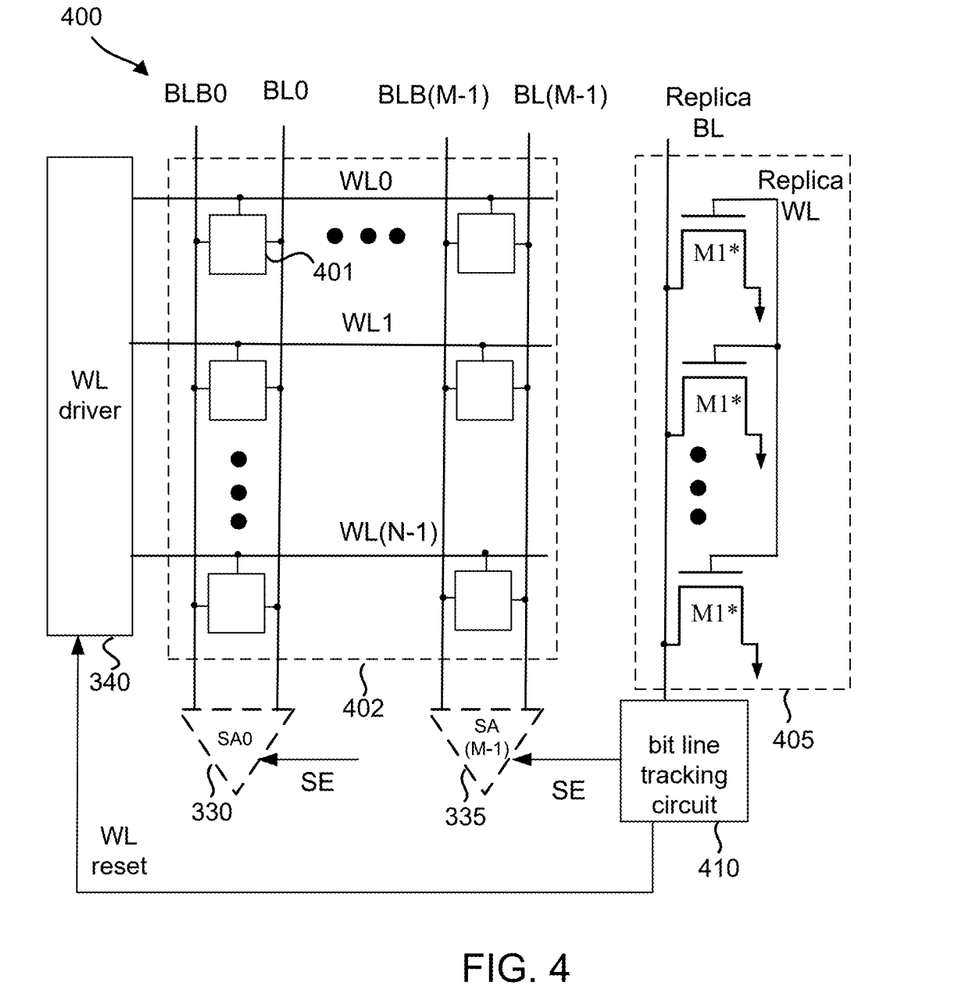
FIG. 4 illustrates an SRAM having a 1T replica column for bit line tracking in accordance with an aspect of the disclosure.

One can thus appreciate that the write operation tracking for a dual-port or a single-port SRAM is analogous. But the read operation tracking in a single-port SRAM self-times the enabling of a sense amplifier whereas the read operation tracking in a dual-port SRAM self-times the clocking of the data output register. With these differences in mind, an example SRAM 400 is shown in FIG. 4 that includes a one-transistor (1T) replica column 405. SRAM 400 may be either a single-port SRAM (or a dual-port or even a triple-port SRAM) with respect to the write operation tracking. However, the read operation tracking for a dual-port implementation is discussed separately below.

An array 402 of bitcells 401 is arranged into rows and columns as discussed for SRAM 300. Each column in the array 402 thus includes N bitcells 401. Each bitcell 401 loads a corresponding amount of capacitive and resistive loading onto the corresponding column's bit lines. The 1T replica column 405 models this loading by including just a single replica access transistor M1* for each bitcell 401. In a single-port implementation, each replica access transistor M1* is matched (has the same size) to the corresponding access transistor M1 (FIG. 1). In a dual-port implementation, each replica access transistor M1* is matched to the corresponding write-port access transistor M1' (FIG. 2). Thus, each replica access transistor M1* has a source coupled to ground. A drain of each replica access transistor M1* couples to the replica bit line analogously to how the drain of each access transistor M1 couples to the corresponding column's bit line (or how each write-port access transistor M1' couples to the corresponding column's write bit line). A replica word line (or alternatively, a replica write word line) may couple to the gate of each replica access transistor M1*. In other implementations, the gate of each replica access transistor M1* may be grounded or may simply float. Although the remaining five transistors in a single-port implementation of each bitcell 401 are not duplicated in the replica column 405, the resistance-capacitance (RC) loading from just the inclusion of the N replica access transistors M1* (and optionally, the replica word line) sufficiently duplicates the single-port bitcell loading on each column's bit line. Similarly, although the remaining seven transistors in a dual-port implementation of each bitcell 401 are not duplicated in the replica column 405, the RC loading from just the inclusion of the N replica access transistors M1* (and optionally, the replica write word line) sufficiently duplicates the dual-port bitcell loading on each column's bit line.

During a read operation in a single-port implementation, a bit line tracking circuit 410 may thus monitor for when a sufficient voltage change has been produced on the replica bit line to assert the sense enable (SE) signal as discussed for SRAM 300 (note that the bit line tracking circuit 410 includes the replica column 405 but is shown separately for illustration clarity) to trigger the sense amplifiers such as sense amplifiers 330 and 335. The tracking circuit 410 may also reset the asserted word line by asserting a word line reset signal (WL reset) at the same time. This resetting of the word line may also be triggered by the tracking circuit 410 during a write operation for both a single-port and dual-port implementation. The sense amplifiers are not enabled during a write operation and would not be present in a dual-port implementation.

Figure 5A:
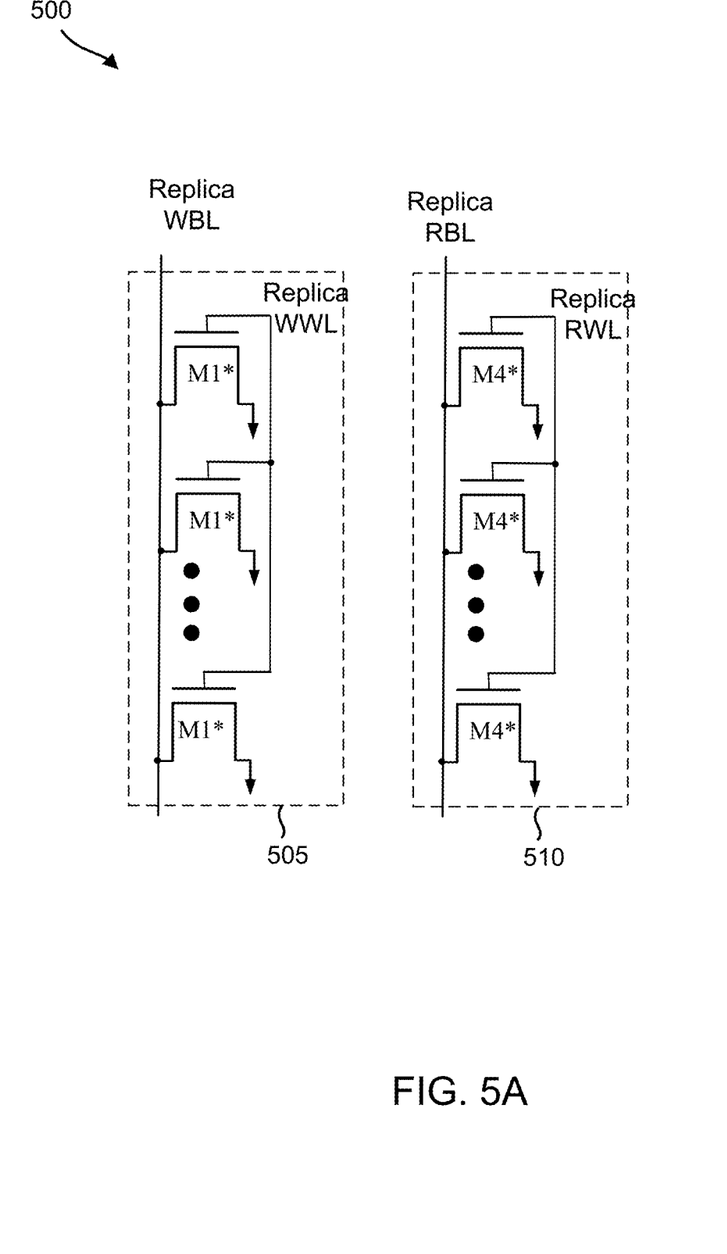
FIG. 5A illustrates a pair of replica columns for the write bit line and read bit line tracking in a dual-port SRAM in accordance with an aspect of the disclosure.

Since each bitcell 401 in a dual-port implementation has both a read port and a separate write port, a dual-port SRAM as disclosed herein may thus use two replica columns, one for the write tracking and one for the read tracking. An example pair 500 of replica columns for a dual-port SRAM are shown in FIG. 5A. A write port replica column 505 includes a replica write bit line (Replica WBL) that couples to the drains of N replica access transistors M1* analogously as discussed for 1T replica column 405. The replica write bit line electrically models the write bit line discussed for the dual-port bitcell 200. Each replica access transistor M1* in replica column 505 is sized to match the access transistors M1' in the dual-port bitcells 200. The source of each replica access transistor M1* couples to ground to model the source grounding of the corresponding write-port access transistor M1'. The gate of each replica access transistor M1* may couple to a corresponding replica write word line (Replica WWL) that electrically models the write word line discussed for the dual-port bitcell 200. Alternatively, the gate of each replica access transistor M1* may couple to ground or float. Advantageously, write-port replica column 505 contains only N transistors whereas a traditional write-port replica column includes N*8 transistors. Write-port replica column 505 thus occupies substantially less semiconductor die space and has less leakage current.

A read-port replica column 510 includes a replica read bit line (Replica RBL) that electrically models the read bit line of the dual-port bitcell 200. The replica read bit line couples to the drains of N replica read-port access transistors M4*. Each replica read-port access transistor M4* is matched to the read-port access transistor M4 of the dual-port bitcell 200. The source of each replica read-port access transistor M4* couples to ground to model the source grounding of the read-port access transistor M4 when its dual-port bitcell 200 stores a binary one. The gate of each replica read-port access transistor M4* may couple to a corresponding replica read word line (Replica RWL) that electrically models the read word line discussed for the dual-port bitcell 200. Alternatively, the gate of each replica read-port access transistor M4* may couple to ground or float. Advantageously, read-port replica column 510 contains only N transistors whereas a traditional read-port replica column includes N*8 transistors. Read-port replica column 510 thus occupies substantially less semiconductor die space and has less leakage current as compared to a traditional read-port replica column.

Figure 5B:
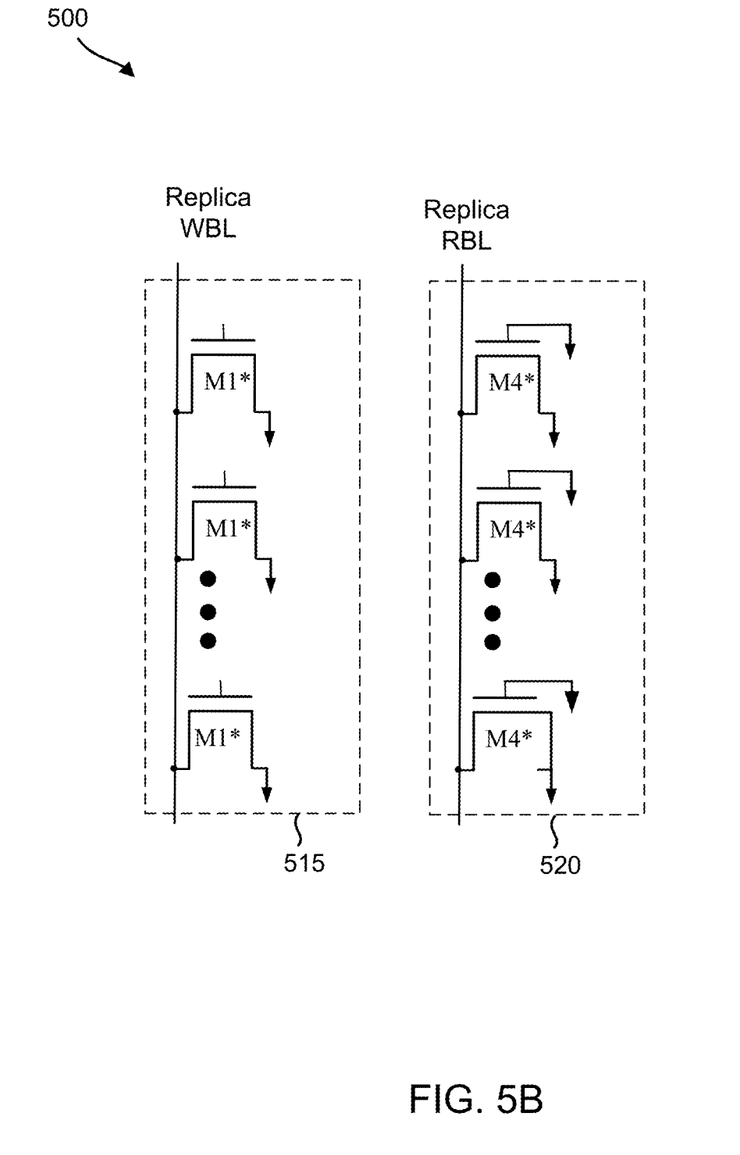
FIG. 5B illustrates another implementation of a pair of replica columns for the write bit line and read bit line tracking in a dual-port SRAM in accordance with an aspect of the disclosure.

Note the 1T replica columns disclosed herein are not limited to single-port or dual-port SRAMs. For example, a three-port SRAM may have a write port and two read ports. The read ports may be modeled by a corresponding read-port replica column and the write port modeled by a corresponding write-port replica column. Alternatively, a pseudo-dual port SRAM may also be modeled using a 1T replica column in accordance with the disclosure. Since the 1T replica column is used to model the RC loading of a bit line, the gate of the replica access transistors need not be coupled to a replica word line but may float or be coupled to ground. For example, the gates of the replica access transistors M1* float in a write-port replica column 515 as shown in FIG. 5B. Similarly, the gates of the replica access transistors M4* in a read-port replica column 520 are coupled to ground.

Figure 6:
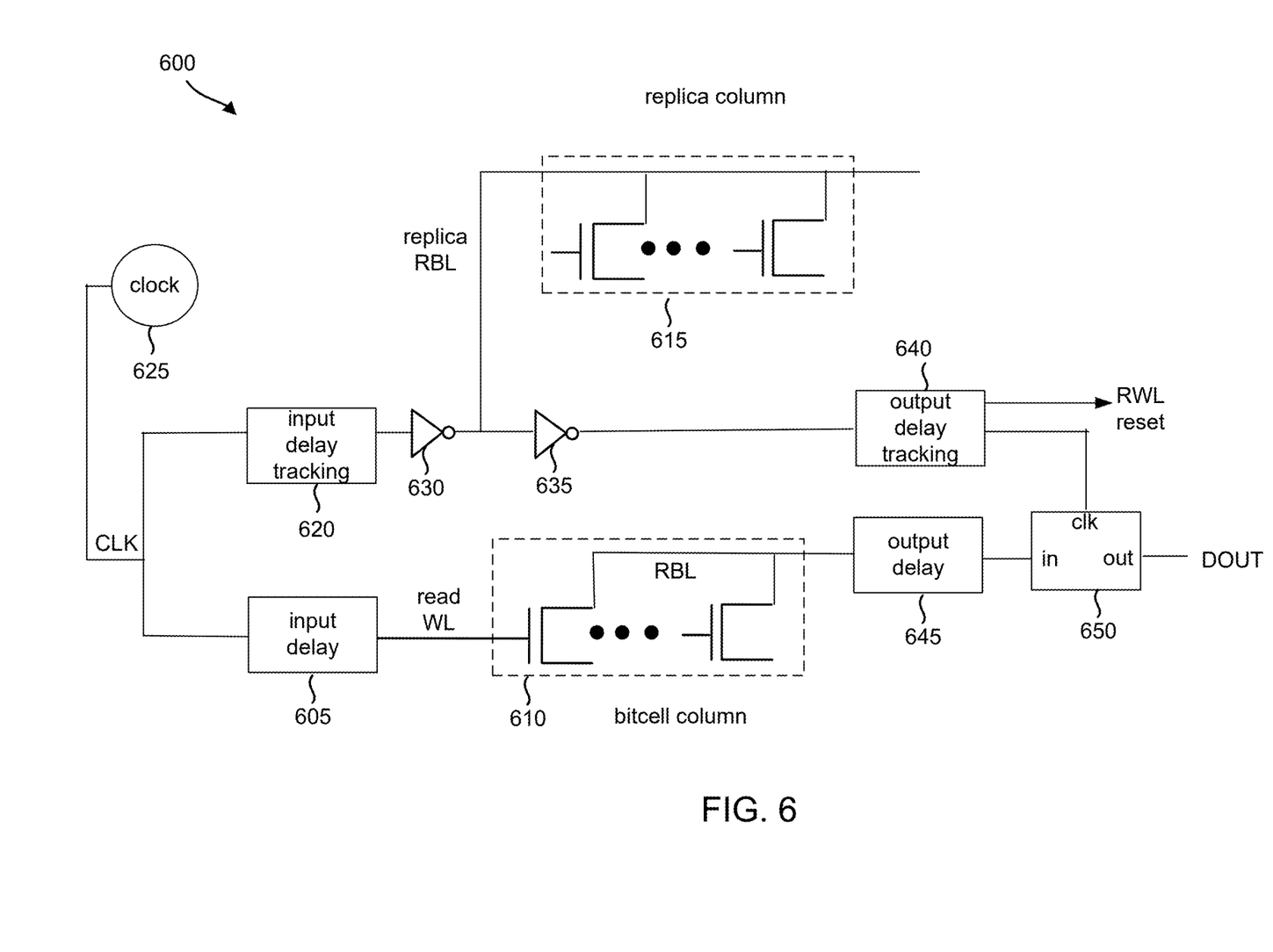
FIG. 6 illustrates a bit line tracking circuit that includes a 1T replica column in accordance with an aspect of the disclosure.

The bit line tracking using a 1T replica column for a write operation is analogous for both a single-port and a dual-port SRAM. In both cases, the bit line tracking may be used to release the asserted word line once the 1T replica column indicates that a sufficient bit line voltage difference has been developed during the write operation. But in a dual-port SRAM, the read bit line is not sensed by a sense amplifier since the sensing is single-ended. Instead, an inverter may be used to invert the read bit line voltage to perform a bit decision as discussed earlier. But the inverter has no means for latching a bit decision in contrast to a sense amplifier. A data output register may thus be used to latch the bit decision from such an inverter. A bit line tracking circuit 600 using a 1T-based replica column 615 as disclosed herein may be advantageously used to clock a data output register 650 during a read operation to a dual-port memory as shown in FIG. 6.

The bitcell tracking circuit 600 responds to a system clock signal (CLK) from a clock source 625 that triggers the read operation. Following the clock assertion, there is then some delay (designated as an input delay 605) before a read word line (read WL) is asserted to switch on the corresponding bitcell access transistor(s). An input delay tracking circuit 620 mimics this word line development delay, which may also be denoted as a input tracking delay. Thus, an output of the input delay tracking circuit 620 is asserted when the read word line is asserted to access a dual-port bitcell column 610 (for illustration clarity, only the corresponding access transistors and the read bit line (RBL) are shown for the dual-port bitcell column). The voltage development delay on the read bit line is modeled by a 1T replica column 615 that functions as discussed for the read-port replica columns 510 and 520 of FIGS. 5A and 5B. For illustration clarity, the sources of the replica access transistors in the replica column 615 are floating but it will be appreciated that these sources may be grounded as discussed for the replica columns 510 and 520. The gates of the replica access transistors in the replica column 615 are floating but may be coupled to ground or to a replica read word line in alternative implementations.

To self-time the read bit line voltage development, the tracking circuit 600 may include a first inverter 630 that inverts an output signal from the input delay tracking circuit 620. Prior to the completion of the word line assertion delay, the output signal from the input delay tracking circuit 620 may be discharged. An output terminal of the first inverter 630 couples to the replica read bit line. The replica read bit line is thus charged to the memory power supply voltage prior to the completion of the word line assertion delay. At the completion of the word line assertion delay, the input delay tracking circuit 620 charges its output signal to the memory power supply voltage. The first inverter 630 will then begin discharging the replica read bit line. A second inverter 635 has an input terminal coupled to the replica read bit line. The second inverter 635 will thus asserts its output signal once the replica read bit line has been discharged to the threshold voltage of the second inverter 635.

During the read operation, an inverter (not illustrated) may sense a bit decision from the read bit line as discussed earlier. The processing delay of this inverter is represented by an output delay 645. An output delay tracking circuit 640 emulates this output delay by delaying the output signal from the second inverter 635 by an output tracking delay accordingly. An output signal from the output delay tracking circuit 640 is thus asserted once the output tracking delay has been completed. This output signal clocks the data output register 650 to latch the sensed bit as a data output signal (DOUT) from the accessed bitcell in the bitcell column 610. At the same time, the output delay tracking circuit 640 may also assert a read word line (RWL) reset signal to reset the read word line.

Figure 7:
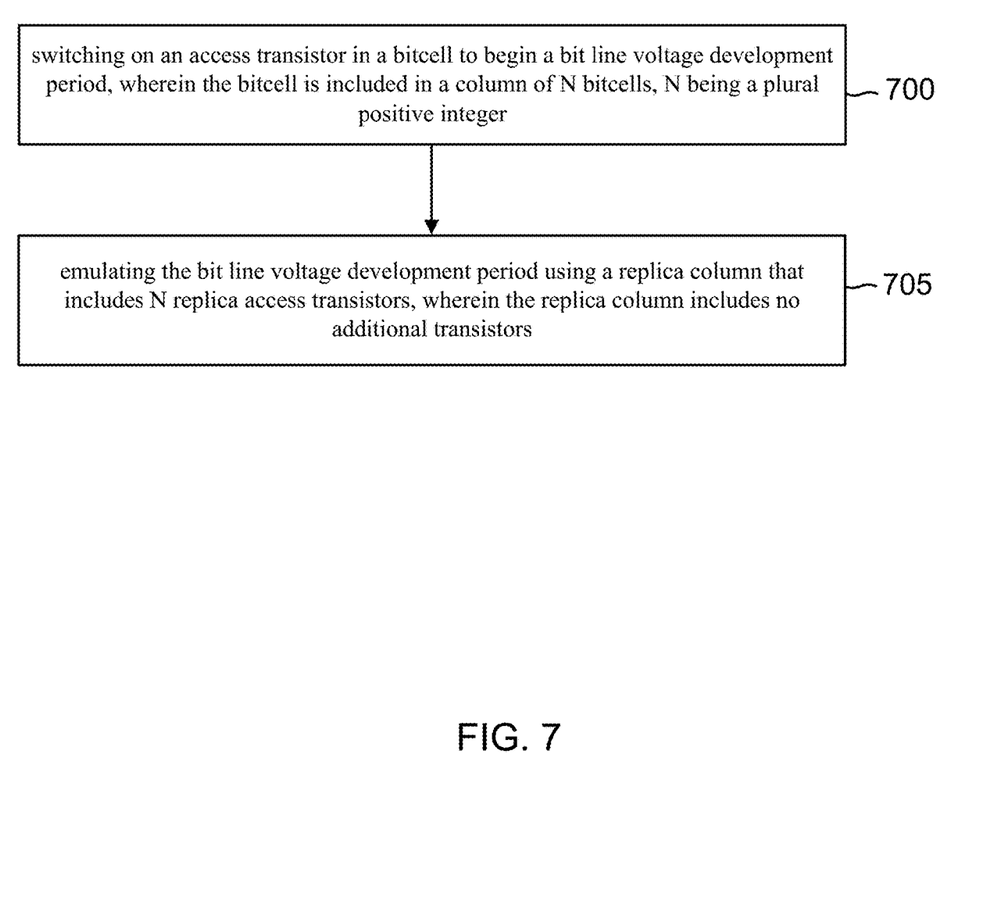
FIG. 7 is a flowchart for a memory access tracking method using a 1T replica column in accordance with an aspect of the disclosure.

A method of tracking a memory access (i.e., either a read operation or a write operation) will now be discussed with regard to the flowchart of FIG. 7. The method includes an act 700 of switching on an access transistor in a bitcell to begin a bit line voltage development period, wherein the bitcell is included in a column of N bitcells, N being a plural positive integer. An example of act 700 would be the any of the: switching on of the access transistor M1 in the single-port bitcell 100, the switching on of the write-port access transistor M1' in the dual-port bitcell 200, or the switching on of the read-port access transistor M4 in the dual-port bitcell 200. In addition, the method includes an act 705 of emulating the bit line voltage development period using a replica column that includes N replica access transistors, wherein the replica column includes no additional transistors. The bit line tracking using any of the 1T replica columns 405, 505, 510, 515, 520, or 615 is an example of act 705.

Figure 8:
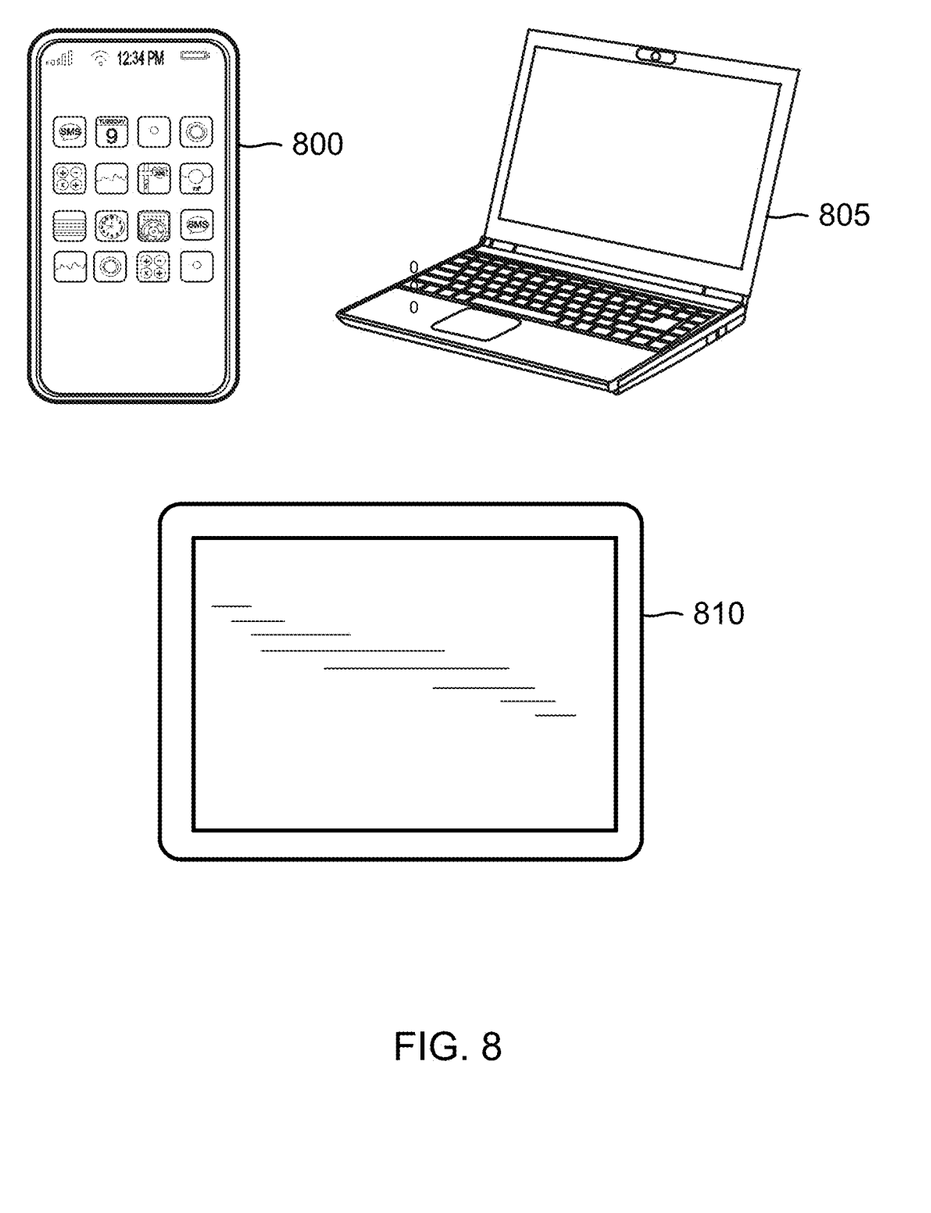
FIG. 8 illustrates some example electronic systems including an integrated circuit having memory with a 1T replica column in accordance with an aspect of the disclosure.

An integrated circuit having a memory with a 1T replica column for bit line tracking may be incorporated in a wide variety of electronic systems. For example, as shown in FIG. 8, a cellular telephone 800, a laptop computer 805, and a tablet PC 810 may all include an integrated circuit having a memory with a 1T replica column for bit line tracking in accordance with the disclosure. Other exemplary electronic systems such as a music player, a video player, a communication device, and a personal computer may also be configured with an integrated circuit having a memory with a 1T replica column for bit line tracking constructed in accordance with the disclosure.

The disclosure will now be summarized in the following series of clauses:

Clause 1. A memory, comprising;
a bitcell array arranged into rows and columns, wherein each column includes a plurality of N bitcells, N being a plural positive integer; and
a bit line tracking circuit including:
a replica column having a replica bit line and N replica access transistors coupled to the replica bit line, the replica column including no additional transistors;
wherein the bit line tracking circuit is configured to control a timing of access to an addressed one of the columns responsive to a change in a voltage of the replica bit line.

Clause 2. The memory of clause 1, further including a plurality of sense amplifiers, wherein the bit line tracking circuit is further configured to assert a sense enable signal to trigger a sensing by the plurality of sense amplifiers responsive to the change in the voltage of the replica bit line.

Clause 3. The memory of clause 1, further comprising:
a word line driver configured to assert a voltage of a word line for an addressed one of the rows, wherein the bit line tracking circuit is further configured to assert a word line reset signal to cause the word line driver to reset the voltage of the word line responsive to the change in the voltage of the replica bit line.

Clause 4. The memory of any of clauses 1-3, wherein the bitcell array is a single-port bitcell array.

Clause 5. The memory of any of clauses 1-3, wherein the bitcell array is a dual-port bitcell array.

Clause 6. The memory of clause 5, wherein the replica bit line is a replica read bit line configured to have a capacitance and resistance substantially equal to a capacitance and resistance of a read bit line in the addressed one of the columns.

Clause 7. The memory of clause 6, wherein the read bit line is formed as a first metal layer lead having a width and a length, and wherein the replica read bit line is a second metal layer lead having the width and the length.

Clause 8. The memory of clause 6, further comprising:
a register, wherein the bit line tracking circuit is further configured to clock the register responsive to the change in the replica bit line voltage.

Clause 9. The memory of clause 8, wherein the bit line tracking circuit further includes:
an input tracking circuit configured to delay a clock signal by an input tracking delay to provide a delayed clock signal;
a first inverter configured to invert the delayed clock signal and having an output terminal coupled to the replica read bit line; and
a second inverter having an input terminal coupled to the replica read bit line, and
an output tracking circuit configured to delay an output signal from the second inverter by an output tracking delay to form output tracking circuit output signal to clock the register.

Clause 10. The memory of clause 9, wherein input tracking delay substantially equals a word line development delay for the memory.

Clause 11. The memory of clause 5, wherein the replica bit line is replica write bit line configured to electrically match a write bit line in the addressed one of the columns.

Clause 12. The memory of any of clauses 1-11, wherein each bitcell includes an access transistor having a first size, and wherein each replica access transistor also has the first size.

Clause 13. The memory of any of clauses 1-12, wherein the replica column further includes a replica word line coupled to a gate of each replica access transistor.

Clause 14. The memory of any of clauses 1-12, wherein a gate of each replica access transistor is configured to float.

Clause 15. The memory of any of clauses 1-12, wherein a gate of each replica access transistor is coupled to ground.

Clause 16. The memory of any of clauses 1-15, wherein the memory is included within a cellular telephone.

Clause 17. A method of tracking a memory access, comprising:
switching on an access transistor in a bitcell to begin a bit line voltage development period, wherein the bitcell is included in a column of N bitcells, N being a plural positive integer; and
emulating the bit line voltage development period using a replica column that includes N replica access transistors, wherein the replica column includes no additional transistors.

Clause 18. The method of clause 17, further comprising:
asserting a word line voltage to begin the memory access, wherein the switching on of the access transistor is responsive to an assertion of the word line voltage.

Clause 19. The method of clause 18, further comprising:
resetting the word line voltage responsive to a voltage change on a replica bit line in the replica column.

Clause 20. The method of clause 19, further comprising:
detecting the voltage change on the replica bit line using an inverter.

Clause 21. The method of clause 19, further comprising:
enabling a sense amplifier to sense a bit responsive to the voltage change on the replica bit line.

Clause 22. The method of clause 19, further comprising:
clocking a register to register a data output signal from the column of N bitcells responsive to the voltage change on the replica bit line.

Clause 23. A replica column for a bit line tracking circuit, comprising:
a replica bit line; and
a plurality of n-type metal-oxide semiconductor (NMOS) replica access transistors, each having a source coupled to ground and a drain coupled to the replica bit line, wherein the replica column includes no additional transistors.

Clause 24. The replica column of clause 23, further comprising:
a replica word line coupled to a gate of each replica access transistor.

Clause 25. The replica column of any of clauses 23-24, wherein a gate of each replica access transistor is coupled to ground.

Clause 26. The replica column of any of clauses 23-24, wherein a gate of each replica access transistor is configured to float.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

We claim:

1. A memory, comprising:
a bitcell array arranged into rows and columns, wherein each column includes a plurality of N bitcells, N being a plural positive integer; and
a bit line tracking circuit including:
a replica column having a replica bit line and N replica access transistors coupled to the replica bit line, the replica column including no additional transistors,
wherein the bit line tracking circuit is configured to control a timing of access to an addressed one of the columns responsive to a change in a voltage of the replica bit line, and
wherein the replica column further includes a replica word line coupled to a gate of each replica access transistor.

2. The memory of claim 1, further including a plurality of sense amplifiers, wherein the bit line tracking circuit is further configured to assert a sense enable signal to trigger a sensing by the plurality of sense amplifiers responsive to the change in the voltage of the replica bit line.

3. The memory of claim 1, further comprising:
a word line driver configured to assert a voltage of a word line for an addressed one of the rows, wherein the bit line tracking circuit is further configured to assert a word line reset signal to cause the word line driver to reset the voltage of the word line responsive to the change in the voltage of the replica bit line.

4. The memory of claim 1, wherein the bitcell array is a single-port bitcell array.

5. The memory of claim 1, wherein the bitcell array is a dual-port bitcell array.

6. The memory of claim 5, wherein the replica bit line is a replica read bit line configured to have a capacitance and resistance substantially equal to a capacitance and resistance of a read bit line in the addressed one of the columns.

7. The memory of claim 6, wherein the read bit line is formed as a first metal layer lead having a width and a length, and wherein the replica read bit line is a second metal layer lead having the width and the length.

8. The memory of claim 6, further comprising:
a data output register, wherein the bit line tracking circuit is further configured to clock the data output register responsive to the change in the replica bit line voltage.

9. The memory of claim 8, wherein the bit line tracking circuit further includes:
an input tracking circuit configured to delay a clock signal by an input tracking delay to provide a delayed clock signal;
a first inverter configured to invert the delayed clock signal and having an output terminal coupled to the replica read bit line;
a second inverter having an input terminal coupled to the replica read bit line, and
an output tracking circuit configured to delay an output signal from the second inverter by an output tracking delay to form an output tracking circuit output signal to clock the register.

10. The memory of claim 9, wherein the input tracking delay substantially equals a word line development delay for the memory.

11. The memory of claim 5, wherein the replica bit line is a replica write bit line configured to electrically match a write bit line in the addressed one of the columns.

12. The memory of claim 1, wherein each bitcell includes an access transistor having a first size, and wherein each replica access transistor also has the first size.

13. The memory of claim 1, wherein the replica column further includes a replica word line coupled to a gate of each replica access transistor.

14. The memory of claim 1, wherein a gate of each replica access transistor is configured to float.

15. The memory of claim 1, wherein a gate of each replica access transistor is coupled to ground.

16. The memory of claim 1, wherein the memory is included within a cellular telephone.

17. A method of tracking a memory access, comprising:
switching on an access transistor in a bitcell to begin a bit line voltage development period, wherein the bitcell is included in a column of N bitcells, N being a plural positive integer;
asserting a word line voltage to begin the memory access, wherein the switching on of the access transistor is responsive to an assertion of the word line voltage;
emulating the bit line voltage development period using a replica column that includes N replica access transistors, wherein the replica column includes no additional transistors; and
resetting the word line voltage responsive to a voltage change on a replica bit line in the replica column.

18. The method of claim 17, further comprising:
detecting the voltage change on the replica bit line using an inverter.

19. The method of claim 17, further comprising:
enabling a sense amplifier to sense a bit responsive to the voltage change on the replica bit line.

20. The method of claim 17, further comprising:
clocking a data output register to register a data output signal from the column of N bitcells responsive to the voltage change on the replica bit line.

21. The method of claim 17, further comprising asserting a sense enable signal to trigger a sensing by a plurality of sense amplifiers in response to the emulated bit line voltage development period.

22. The method of claim 17, wherein the replica bit line is a replica write bit line configured to electrically match a write bit line of the bitcell.

23. A replica column for a bit line tracking circuit, comprising:
a replica bit line; and
a plurality of n-type metal-oxide semiconductor (NMOS) replica access transistors, each having a source coupled to ground and a drain coupled to the replica bit line, wherein the replica column includes no additional transistors,
wherein the plurality of NMOS replica access transistors is configured to emulate a bit line voltage development period responsive to a voltage of the replica bit line and to reset a word line voltage responsive to the emulated bit line voltage development period.

24. The replica column of claim 23, further comprising:
a replica word line coupled to a gate of each replica access transistor.

25. The replica column of claim 23, wherein a gate of each replica access transistor is coupled to ground.

26. The replica column of claim 23, wherein a gate of each replica access transistor is configured to float.

* * * * *